United States Patent
Largman et al.

(10) Patent No.: US 10,506,032 B2
(45) Date of Patent: Dec. 10, 2019

(54) AUTOMATED LOAD DISTRIBUTION FOR A GROUP-BASED COMMUNICATION PLATFORM

(71) Applicant: SLACK TECHNOLOGIES, INC., San Francisco, CA (US)

(72) Inventors: Raissa Largman, San Francisco, CA (US); Ananya Yadav, San Francisco, CA (US); Serguei Mourachov, Vancouver (CA); Neil Walker, Kings Beach, CA (US); Denis Sodol, Vancouver (CA); Paul Lloyd, Berkeley, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/963,636

(22) Filed: Apr. 26, 2018

(65) Prior Publication Data

US 2019/0334983 A1    Oct. 31, 2019

(51) Int. Cl.
*H04L 29/08*    (2006.01)
*H04L 12/24*    (2006.01)

(52) U.S. Cl.
CPC ...... *H04L 67/1034* (2013.01); *H04L 41/0654* (2013.01)

(58) Field of Classification Search
CPC .................. H04L 67/1034; H04L 41/0654
See application file for complete search history.

(56) References Cited

U.S. PATENT DOCUMENTS

| 8,016,446 B2* | 9/2011 | Chang ..................... F21V 5/002 |
| | | 362/626 |
| 9,569,517 B1* | 2/2017 | Smola ..................... G06F 11/00 |
| 2001/0049717 A1* | 12/2001 | Freeman ............... G06F 9/5027 |
| | | 709/203 |

(Continued)

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(Continued)

*Primary Examiner* — Chi H Pham
*Assistant Examiner* — Weibin Huang
(74) *Attorney, Agent, or Firm* — Alston & Bird LLP

(57) ABSTRACT

Various embodiments are directed to systems and methods for automatically distributing loads among computing devices involved in message delivery within a group-based communication platform. Embodiments utilize a status checker to monitor the relative health and/or utilization of various channel servers each servicing a group-based communication channel for communication among a particular group of client devices. Upon detecting that one or more of the channel servers exhibit failing health characteristics, the status checker may automatically reallocate the messaging load performed by the failing channel server to other servers, thereby redefining the group-based communication channel associated with a particular group to encompass the newly assigned channel server and minimizing the impact of the failed channel server on message distribution within the group-based communication channel.

17 Claims, 10 Drawing Sheets

(56) References Cited

U.S. PATENT DOCUMENTS

| | | | |
|---|---|---|---|
| 2007/0016663 A1* | 1/2007 | Weis | G06F 11/2028 709/223 |
| 2013/0226971 A1* | 8/2013 | Shoolman | H03M 7/3088 707/790 |
| 2017/0242904 A1* | 8/2017 | Hattori | G06F 12/00 |
| 2019/0065258 A1* | 2/2019 | Irudayaraj | G06F 9/505 |

OTHER PUBLICATIONS

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

Matsumoto, T. et al., "Chocoa Communicator — A New Communication System Based on Awareness and Text Communications—", Fujitsu Sci. Tech. J., 36, 2, (Dec. 2000) 154-161.

* cited by examiner

AUTOMATED LOAD DISTRIBUTION FOR A GROUP-BASED COMMUNICATION PLATFORM

BACKGROUND

Systems have been provided for disseminating shared content within a communication interface among a plurality of client devices. However, existing systems are vulnerable to unexpected and prolonged periods of system downtime in the event of centralized system hardware malfunctions. Through applied effort, ingenuity, and innovation, many of these identified deficiencies and problems have been solved by developing solutions that are in accordance with the embodiments of the present invention, many examples of which are described in detail herein.

BRIEF SUMMARY

In general, various embodiments provide methods and systems for automatic load allocation among a plurality of channel servers upon detecting a failing channel server within a production environment. Upon detecting a failing channel server (e.g., based on health characteristics monitored by a status checker) within a production environment, one or more spare channel servers may be substituted into the production environment, and data-based communication loads transmitted from one or more gateway servers may be rerouted to one or more of the newly added spare channel servers with minimal performance impacts seen within the communications exchange between client devices within a group.

Certain embodiments are directed to a computer-implemented method for automated load allocation among a plurality of channel servers configured for data exchange within a group-based communication platform. In various embodiments, the method comprises: monitoring health characteristics of a plurality of channel servers based at least in part on health data compiled by a status checker, wherein each of the plurality of channel servers synchronize communications between client devices of at least one group of client devices as defined based at least in part on a configuration key; and upon detecting failing health characteristics of a failing channel server identified within the plurality of channel servers: establishing a lock between a first admin server of a plurality of admin servers and the configuration key; updating the configuration key via the first admin server to replace the failing channel server with a replacement channel server; and releasing the configuration key to implement the updated configuration key.

In certain embodiments, the configuration key is stored within a memory associated with the status checker and is accessible to each of the plurality of admin servers. Moreover, each of the plurality of admin servers may be configured to maintain a listing of active and failed channel servers, and wherein monitoring health characteristics of a plurality of channel servers comprises: updating the listing of active and failed channel servers maintained by each of the plurality of admin servers. Moreover, establishing the lock between the first admin server and the configuration key according to various embodiments comprises: each of the plurality of admin servers attempting to establish a lock with the configuration key; and establishing the lock with the first admin server of the plurality of admin servers to prevent other admin servers from modifying the configuration key. In certain embodiments, establishing the lock between the first admin server and the configuration key comprises: each of the plurality of admin servers attempting to establish a lock with the configuration key; establishing a lock with a second admin server of the plurality of admin servers; and upon detecting failing health characteristics of the second admin server, establishing a lock with the first admin server of the plurality of admin servers to prevent other admin servers from modifying the configuration key. Moreover, a plurality of gateway servers may be subscribed with each of the channel servers, and wherein implementing the updated configuration key comprises updating the subscription of each of the plurality of gateway servers subscribed with the failing channel server to the replacement channel server. In certain embodiments, the replacement channel server is selected from a plurality of spare channel servers that are not in use for synchronizing communication between client devices.

Certain embodiments are directed to a system for automated load allocation among a plurality of channel servers configured for data exchange within a group-based communication platform. In various embodiments, the apparatus comprises: a plurality of admin servers, wherein each admin server comprises: one or more non-transitory memory storage areas; and one or more processors; and wherein the plurality of admin servers are collectively configured to: monitor health characteristics of a plurality of channel servers based at least in part on health data compiled by a status checker, wherein each of the plurality of channel servers synchronize communications between client devices of at least one group of client devices as defined based at least in part on a configuration key; and upon detecting failing health characteristics of a failing channel server identified within the plurality of channel servers: establish a lock between a first admin server of the plurality of admin servers and the configuration key; update the configuration key via the first admin server to replace the failing channel server with a replacement channel server; and release the configuration key to implement the updated configuration key.

In various embodiments, the configuration key is stored within a memory associated with the status checker and is accessible to each of the plurality of admin servers. Moreover, each of the plurality of admin servers may be configured to maintain a listing of active and failed channel servers within the one or more non-transitory memory storage areas, and wherein monitoring health characteristics of a plurality of channel servers comprises: updating the listing of active and failed channel servers maintained by each of the plurality of admin servers. In certain embodiments, establishing the lock between the first admin server and the configuration key comprises: each of the plurality of admin servers attempting to establish a lock with the configuration key; and establishing the lock with the first admin server of the plurality of admin servers to prevent other admin servers from modifying the configuration key.

Moreover, establishing the lock between the first admin server and the configuration key according to various embodiments comprises: each of the plurality of admin servers attempting to establish a lock with the configuration key; establishing a lock with a second admin server of the plurality of admin servers; and upon detecting failing health characteristics of the second admin server, establishing a lock with the first admin server of the plurality of admin servers to prevent other admin servers from modifying the configuration key. In certain embodiments, a plurality of gateway servers are subscribed with each of the channel servers, and wherein implementing the updated configuration key comprises updating the subscription of each of the plurality of gateway servers subscribed with the failing channel server to the replacement channel server. Moreover, the replacement channel server may be selected from a plurality of spare channel servers that are not in use for synchronizing communication between client devices.

Various embodiments are directed to a computer program product for automated load allocation among a plurality of channel servers configured for data exchange within a group-based communication platform, the computer program product comprising at least one non-transitory computer-readable storage medium having computer-readable program code portions stored therein. In various embodiments, the computer-readable program code portions comprising an executable portion configured to: monitor health characteristics of a plurality of channel servers based at least in part on health data compiled by a status checker, wherein each of the plurality of channel servers synchronize communications between client devices of at least one group of client devices as defined based at least in part on a configuration key; and upon detecting failing health characteristics of a failing channel server identified within the plurality of channel servers: establish a lock between a first admin server of a plurality of admin servers and the configuration key; update the configuration key via the first admin server to replace the failing channel server with a replacement channel server; and release the configuration key to implement the updated configuration key.

According to certain embodiments, the configuration key is stored within a memory associated with the status checker and is accessible to each of the plurality of admin servers. Moreover, establishing the lock between the first admin server and the configuration key may comprise: each of the plurality of admin servers attempting to establish a lock with the configuration key; and establishing the lock with the first admin server of the plurality of admin servers to prevent other admin servers from modifying the configuration key. In certain embodiments, establishing the lock between the first admin server and the configuration key comprises: each of the plurality of admin servers attempting to establish a lock with the configuration key; establishing a lock with a second admin server of the plurality of admin servers; and upon detecting failing health characteristics of the second admin server, establishing a lock with the first admin server of the plurality of admin servers to prevent other admin servers from modifying the configuration key. Moreover, a plurality of gateway servers may be subscribed with each of the channel servers, and wherein implementing the updated configuration key comprises updating the subscription of each of the plurality of gateway servers subscribed with the failing channel server to the replacement channel server. In certain embodiments, the replacement channel server is selected from a plurality of spare channel servers that are not in use for synchronizing communication between client devices.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
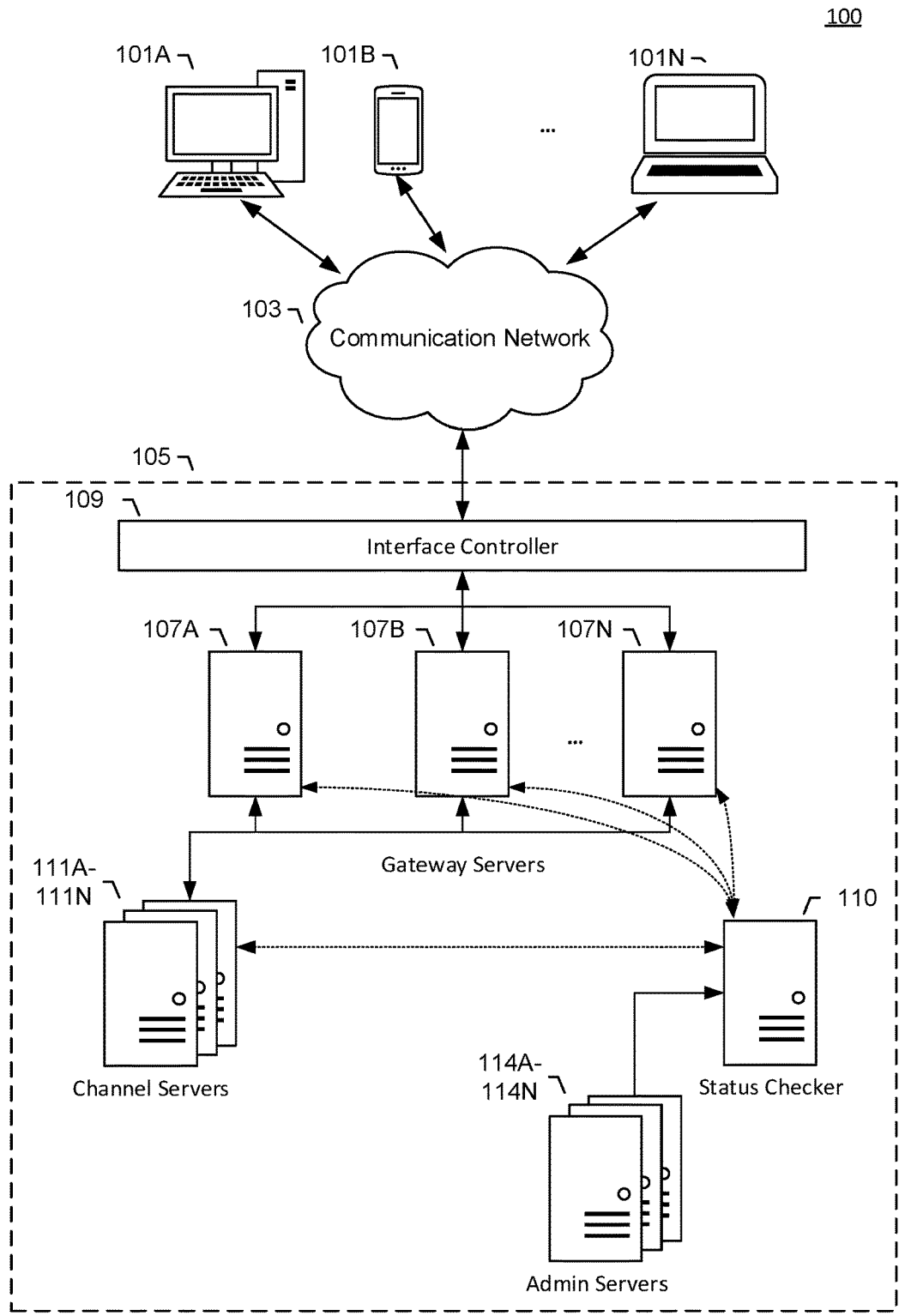
FIG. 1 shows an example configuration of a location-based communication platform according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments relate generally to systems and methods for automatically distributing, allocating, and/or directing data-based loads generated to support message exchanges between client devices operable via a group-based communication platform. Groups of individual client devices (e.g., groups exchanging content on a group-based communication channel operating via the group-based communication platform) are supported by one or more gateway servers—the one or more gateway servers being embodied as a subset of available gateway servers (the initial subset being a first subset of the plurality of available gateway servers) and one or more channel servers (of a plurality of channel servers). Communications exchanged within the group (e.g., generated by a first client device and disseminated to other client devices within the group) are transmitted to each of the one or more gateway servers supporting the group and from the gateway servers to a target channel server supporting the group. The communications are also disseminated from the plurality of gateway servers to the client devices associated with other members of the group.

Messages shared within a group comprise metadata utilized to direct messages for dissemination within an appropriate group. The metadata may comprise both a user identifier (e.g., identifying the user who generated the message), as well as a group and/or channel identifier to direct the message to the appropriate group. Messages may first pass through an interface controller after transmission from the client device, and the interface controller may direct the message to the appropriate gateway servers for dissemination to client devices within the group based on the content of metadata transmitted with the message content. Moreover, the gateway servers are configured to transmit the message to an appropriate channel server based at least in part on data stored within a configuration key generated by one or more admin servers. The channel servers store the message within a database for indexing and/or storage.

The gateway servers may be configured to reference the configuration key generated by the admin servers to match groups and/or channels with respective channel servers. The configuration key may be generated and/or maintained by the admin servers (the plurality of admin servers operating in the alternative to update the configuration key) based at least in part on health data provided by a status checker configured to monitor the health of the plurality of channel servers and/or admin servers (e.g., based on data transmissions provided between the servers (channel servers and/or admin servers) and the status checker), and upon detecting that one or more of the channel servers are exhibiting failing health characteristics, the admin servers may automatically update the configuration key to reallocate data loads (e.g., generated based at least in part on communications within a group-based communication channel) transmitted through the failing channel servers to other channel servers determined to be operating normally.

The updated configuration key may be accessible to the admin servers and/or the gateway servers (e.g., retrievable from memory storage in association with the status checker and/or transmitted to one or more of the admin servers and/or gateway servers). Based at least in part on the content of the updated configuration key, the gateway servers route messages to appropriate channel servers in accordance with the updated configuration key. Thus, the channel server servicing a particular group of client devices (through the one or more gateway servers) may change in the event that one or more of the channel servers initially supporting the group is determined to be failing by the status checker. In that instance, a failing channel server may be substituted for a different channel server (e.g., a spare channel server). Users communicating via a group-based communication platform (e.g. a cloud-based group collaboration tool provided by SLACK®) that is structured in accordance with various embodiments of the invention thus experience minimal service interruption when one of the channel servers malfunctions.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group.

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

A communication channel may reference a single gateway server and a single channel server, or a plurality of gateway servers and a single channel server, such that data exchanged among client devices on a common communication channel is replicated across each of the gateway servers referenced by the communication channel. In certain embodiments, a single gateway server may be referenced by a plurality of communication channels, and therefore the gateway servers may be configured for disseminating replicated data exchanged on a single communication channel based on channel identifiers associated with particular client devices, such that the transmitted data is displayed to users of client devices via a group-based communication channel interface. In certain embodiments, communication channels may be mapped to a plurality of gateway servers and a single channel server in accordance with data stored in a configuration key. The configuration key may be generated and/or maintained via one or more admin servers based at least in part on health characteristics monitored by a status checker.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

As used herein, the terms "messaging communication" and "message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Messages for display within a group-based communication channel interface are "replicated" across devices within the group-based communication channel, including client devices, gateway servers, and/or channel servers. Replication causes copies of at least a portion of each message (including message content and/or attachments) to be created in memories associated with each of the devices associated with a group-based communication channel. The replicated copies may be generated by transmitting the message (e.g., copies of the message) from a single device (e.g., a single client device and/or a single interface controller) to a plurality of devices (e.g., a plurality of client devices and/or a plurality of gateway servers). However, it should be understood that messages may be replicated by transmitting a message from a single device to a separate, single device, and this process may be repeated one or more times to replicate a message among a plurality of devices. In certain embodiments, message replication among a plurality of gateway servers and a single channel server enables messages to be shared with client devices within a common group-based communication channel that spans a plurality of gateway servers (e.g., each client device may communicate with a separate gateway server) and is supported by the single channel server. However, it should be understood that certain embodiments support channels via a single gateway server, and accordingly the single gateway server disseminates messages to the appropriate client devices in such configurations.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Gateway servers" as discussed herein with reference to certain embodiments are geographically distributed computing devices configured for interacting with various client devices through an interface controller for receiving and/or disseminating messages for distribution within a group-based communication channel. Gateway servers may operate alone to support group-based communication channels (i.e., a single gateway server supports a group-based communication channel). In certain embodiments, gateway servers operate within defined subsets of a plurality of gateway servers (e.g., each defined subset encompassing greater than one gateway server and less than a total number of available gateway servers) to service a single group-based communication channel, and each member of the group-based communication channel (reflective by associated client devices) is in communication with a single gateway server of the subset of gateway servers. As mentioned herein, alternative gateway server embodiments may be centrally-located computing devices corresponding with a centrally-located interface controller.

Moreover, "channel servers" as discussed herein with reference to certain embodiments are centrally-located computing devices configured for interacting with a plurality of gateway servers. In certain embodiments, all of the gateway servers within the subset of gateway servers servicing a single group-based communication channel communicate with a single channel server servicing the group-based communication channel. The channel servers provide an interface between the gateway servers and a storage location for storage and indexing of messages exchanged via the group-based communication channel.

The "interface controllers" as discussed with reference to various embodiments are geographically-distributed computing devices configured for providing an interface enabling communications between the individual client devices and respective gateway servers. In certain embodiments, a single interface controller interacts with all of the gateway servers within a subset of gateway servers servicing a particular group-based communication channel. Moreover, the interface controllers may communicate with all of the available gateway servers to enable communications among and between any users of the group-based communications platform.

"Admin servers" as discussed herein with reference to certain embodiments are centrally-located computing devices configured for generating and/or maintaining a configuration key utilized by the gateway servers, channel servers, and/or interface controllers for directing messages between and/or among the plurality of computing devices to support group-based communications between a plurality of client devices. The admin servers monitor health characteristics of the gateway servers, channel servers, and/or other admin servers, as determined based at least in part by a status checker, and updates the configuration key to maintain healthy computing systems within a production environment supporting the group-based communications among client devices. The admin servers may be configured to provide updates to the configuration key stored in a separate memory storage device (e.g., associated with a status checker) accessible to the gateway servers, channel servers, and/or admin servers (e.g., stored within and/or in association with the status checker), thereby enabling the computing devices to retrieve updated configuration keys once generated.

The "configuration key" as utilized herein is a data file that defines interactions between a plurality of computing entities. The configuration key comprises executable data usable by various computing entities (e.g., gateway servers, channel servers, and/or the like) to request and/or establish communication connections with other, separate computing entities. As discussed herein, the configuration key may be accessible to gateway servers, and utilized by those gateway servers to establish communication connections with one or more channel servers to enable data transfer therebetween.

As mentioned, the configuration key may be stored in a memory storage device associated with one computing entity (e.g., a status checker), but may be maintained by one of a plurality of second computing entities (e.g., admin servers). This configuration enables a plurality of second computing entities (in the alternative) to provide updates to a single configuration key that is implemented via the group-based communication platform. Thus, if one of the plurality of second computing entities fails, another of the plurality of second computing entities may update the configuration key if needed, thereby minimizing the impact of a failed computing entity on the overall functionality of the group-based communication platform.

As one of those second computing entities (e.g., admin servers) updates content within the configuration key, the admin server establishes a "lock" with the configuration key to prevent other computing entities (e.g., other admin servers) from accessing and/or modifying the configuration key simultaneously. Establishing the lock thereby ensures that only a single instance of the configuration key is maintained within the group-based communication platform to prevent conflicting configuration keys from being generated and/or passed to various computing entities. In instances in which a plurality of admin servers are available to update the configuration key, each of the plurality of admin servers may attempt to establish a lock simultaneously, but ultimately only a single admin server successfully establishes the lock, and that single admin server updates the configuration key as needed. Once the configuration key is updated, the admin server releases the lock, thereby enabling other computing entities (e.g., channel servers, gateway servers, interface controller, and/or the like) to retrieve the updated configuration key. Moreover, in certain embodiments the lock may be released prior to completion of an update to the configuration key, in instances in which the admin server fails after obtaining the lock, but before completion of the configuration key update. In such embodiments, the lock may be released by other admin servers, by the status checker, and/or by another computing entity.

Gateway servers and other computing devices may be configured to self-diagnose the health of the computing devices, and/or separate computing devices (e.g., a status checker system) may be configured to diagnose the relative health of a particular computing device. Computing devices (e.g., gateway servers, channel servers, and/or admin servers) may exhibit various health characteristics that may be indicative of the relative performance of the computing device. Healthy characteristics may be identified as being within a given tolerance of expected performance (e.g., meeting a least a minimum response speed or operational latency, meeting at least a minimum processing speed, transmitting health status data (e.g., pings) to the status checker according to a defined schedule (e.g., every 20 seconds), and/or the like). By extension, failing health characteristics are identified as not falling within the tolerance of expected performance characteristics of the computing device. Failing health characteristics may be exhibited by computing devices (e.g., channel servers and/or gateway servers) that are entirely unresponsive (e.g., disconnected from a network), slow to respond, and/or the like.

The data indicative of the health characteristics of channel servers are collected/determined/generated by a status checker, embodied in certain embodiments as a centrally-located computing device in communication with each of the plurality of the plurality of channel servers, and/or the plurality of admin servers. Beyond collecting/determining/generating data indicative of health characteristics of the channel servers and/or admin servers, the status checker may store configuration keys for directing communications from particular gateway servers to a particular channel server. Therefore, the status checker is in communication with the gateway servers to provide the configuration key to enable the gateway servers to properly direct messages to respective channel servers.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication platform 105 via a communication network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

In the illustrated embodiment, the group-based communication platform 105 includes a plurality of gateway servers 107A-107N accessible via the communication network 103 via an interface controller 109. The gateway servers 107A-107N are in communication with one or more channel servers 111A-111N, and the gateway servers 107A-107N, the channel servers 111A-111N, and the interface controller 109 communicate with a status checker 110 and one or more admin servers 114A-114N.

The gateway servers 107 may each be embodied as a computer or computers as known in the art. In the illustrated embodiment of FIG. 1, the gateway servers 107 provide for receiving electronic data from various sources, including, but not limited to, the client devices 101A-101N via the communication network 103 and/or the interface controller 109. For example, the gateway servers 107 may be operable to receive and process electronic messages provided by the client devices 101A-101N. The gateway servers 107 are further configured to transmit and/or receive data (e.g., messages) to one or more channel servers 111A-111N, such that the channel servers 111A-111N maintain consistent data across all gateway servers 107 associated with a single group and/or channel. The gateway servers 107 may also facilitate transmission and amplification of electronic messages to the client devices 101A-101N. Moreover, as discussed herein, the gateway servers 107 receive and/or retrieve configuration keys (e.g., generated by an admin server 114) to configure communications between the gateway servers 107 and the one or more channel servers 111A-111N.

Similarly, the interface controller 109 (or plurality of interface controllers 109) may be embodied as a computer or computers as known in the art. In the illustrated embodiment of FIG. 1, the interface controller 109 provides for receiving electronic data from various sources, including, but not limited to, the client devices 101A-101N via the communications network 103. For example, the interface controller 109 may be operable to receive and process electronic messages provided by the client devices 101A-101N. The interface controller 109 of the illustrated embodiment is also configured to parse metadata provided as a portion of one or more electronic messages, and to direct the electronic messages to one or more gateway servers 107 based at least in part on the content of the metadata associated with the electronic messages.

The admin server 114 (or plurality of admin servers 114A-114N) may likewise be embodied as a computer or computers as known in the art. The illustrated embodiment of FIG. 1, the admin servers 114A-114N provide for monitoring health characteristics generated by a status checker and maintaining a configuration key to be disseminated to various other computing entities.

The client devices 101A-101N may be any computing device as defined above. Electronic data received by the gateway servers 107 and the interface controller 109 from the client devices 101A-101N may be provided in various forms and via various methods.

In some preferred and non-limiting embodiments, one or more of the client devices 101A-101N are mobile devices, such as smartphones or tablets. The one or more client devices may execute an "app" to interact with the gateway servers 107 and/or interface controller 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system.

In some preferred and non-limiting embodiments, the client devices 101A-101N may interact with the gateway servers 107A-107N and/or interface controller 109 via a web browser. The client devices 101A-101N may also include various hardware or firmware designed to interact with the gateway servers 107A-107N and/or interface controller 109.

In some embodiments of an exemplary group-based communication platform 105, a message or messaging communication may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

POST/authrequest.php HTTP/1.1
Host: www.server.com
Content-Type: Application/XML
Content-Length: 667
<?XML version="1.0" encoding="UTF-8"?>
<auth_request>
  <timestamp>2020-12-31 23:59:59</timestamp>
  <user_accounts_details>
    <user_account_credentials>
      <user_name>ID_user1</user_name>
      <password>abc 123</password>
      //OPTIONAL <cookie>cookieID</cookie>
      //OPTIONAL
        <digital_cert_link>www.mydigitalcertificate.com/JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <client_details>//iOS Client with App and Webkit
  //it should be noted that although several client details
  //sections are provided to show example variants of client
  //sources, further messages will include only on to save
  //space
  <client_IP>10.0.0.123</client_IP>
  <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
  <client_product_type>iPhone6,1</client_product_type>
  <client_serial_number>DNXXX1X1XXXX</client_serial_number>
  <client_UDID>3XXXXXXXXXXXXXXXXXXXXXXXD</client_UDID>
  <client_OS>iOS</client_OS>
  <client_OS_version>7.1.1</client_OS_version>
  <client_app_type>app with webkit</client_app_type>
  <app_installed_flag>true</app_installed_flag>
  <app_name>MSM.app</app_name>
  <app_version>1.0</app_version>
  <app_webkit_name>Mobile Safari</client_webkit_name>
  <client_version>537.51.2</client_version>
  </client_details>
  <client_details>//iOS Client with Webbrowser
  <client_IP>10.0.0.123</client_IP>
  <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
  <client_product_type>iPhone6,1</client_product_type>
  <client_serial_number>DNXXX1X1XXXX</client_serial_number>
  <client_UDID>3XXXXXXXXXXXXXXXXXXXXXXD</clientUDID>
  <client_OS>iOS</client_OS>
  <client_OS_version>7.1.1</client_OS_version>
  <client_app_type>web browser</client_app_type>
  <client_name>Mobile Safari</client_name>
  <client_version>9537.53</client_version>
  </client_details>
  <client_details>//Android Client with Webbrowser
  <client_IP>10.0.0.123</client_IP>
  <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
  <client_product_type>Nexus S</client_product_type>
  <client_serial_number>YXXXXXXXXZ</client_serial_number>
  <client_UDID>FXXXXXXXXX-XXXX-XXXX-XXXX-XXXXXXXXXXXXX</client_UDID>
  <client_OS>Android</client_OS>
  <client_OS_version>4.0.4</client_OS_version>
  <client_app_type>web browser</client_app_type>

```
<client_name>Mobile Safari</client_name>
<client_version>534.30</client_version>
</client_details>
<client_details>//Mac Desktop with Webbrowser
<client_IP>10.0.0.123</client_IP>
<user_agent_string>Mozilla/5.0 (Macintosh; Intel Mac
   OS X 10_9_3) AppleWebKit/537.75.14 (KHTML, like
   Gecko) Version/7.0.3
Safari/537.75.14</user_agent_string>
<client_product_type>MacPro5,1</client_product_type>
<client_serial_number>YXXXXXXXXZ</client_serial_
   number>
<client_UDID>FXXXXXXXXX-XXXX-XXXX-
   XXXX-XXXXXXXXXXXX</client_UDID>
<client_OS>Mac OS X</clientOS>
<client_OS_version>10.9.3</client_OS_version>
<client_app_type>web browser</client_app_type>
<client_name>Mobile Safari</client_name>
<client_version>537.75.14</client_version>
</client_details>
<message>
<message_identifier>ID_message_10</message_identi-
   fier>
<team_identifier>ID team_1</team_identifier>
<channel_identifier>ID_channel1</channel_Identifier>
<contents>That is an interesting invention. I have
   attached a copy our patent policy.</contents>
<attachments>patent_policy.pdf</attachments>
</message>
</auth_request>
```

In the illustrated embodiment, the group-based communication platform 105 comprises a plurality of gateway servers 107 configured to receive messages transmitted between a plurality of client devices 101A-101N within a group identified by a group identifier, and to facilitate dissemination of replicated copies of the messages among the client devices 101A-101N that collectively form the group.

In some embodiments, a group identifier as defined above may be associated with the message. In some embodiments, a group-based communication channel identifier as defined above may be associated with the message.

In some embodiments, a sending user identifier as defined above may be associated with the message. In one implementation, the message may be parsed (e.g., using PHP commands) to determine a sending user identifier of the user who sent the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID=ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the gateway servers 107). Metadata associated with the message may be determined and the message may be indexed in the gateway server 107, channel server 111 (after receipt of the message at the channel server 111 and/or a database associated with the channel server 111). In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in the gateway servers 107, channel servers 111, and/or database 115 to facilitate searching. In one embodiment, the files may be indexed such that a company's or a group's files are indexed at a separate distributed repository.

Examples of electronic information exchange among one or more client devices 101A-101N and the group-based communication platform 105 are described below with reference to FIGS. 7-10.

Figure 7:
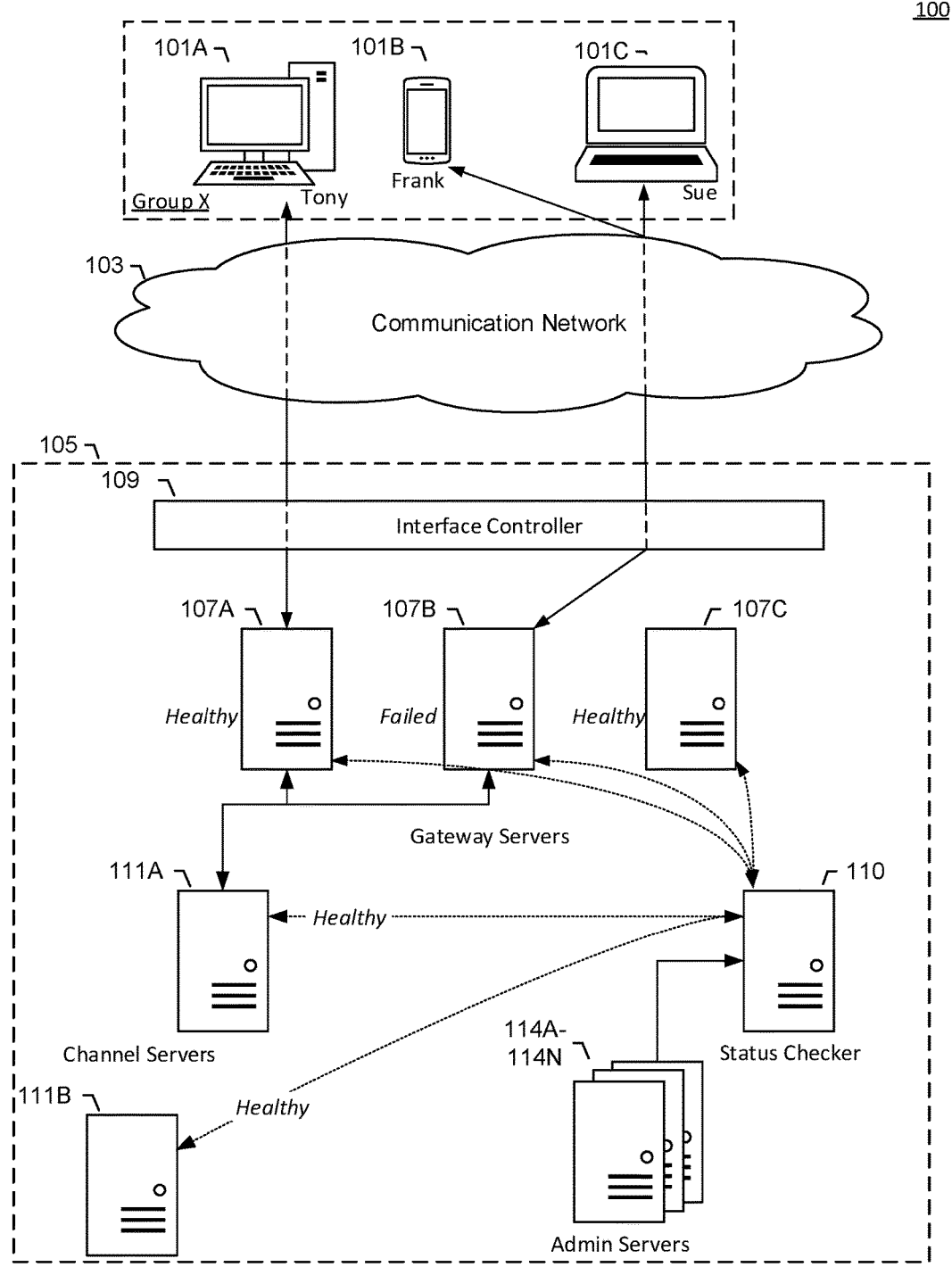
FIGS. 7-10 illustrate example data flows among components of a group-based communication platform according to one embodiment.
Figure 8:
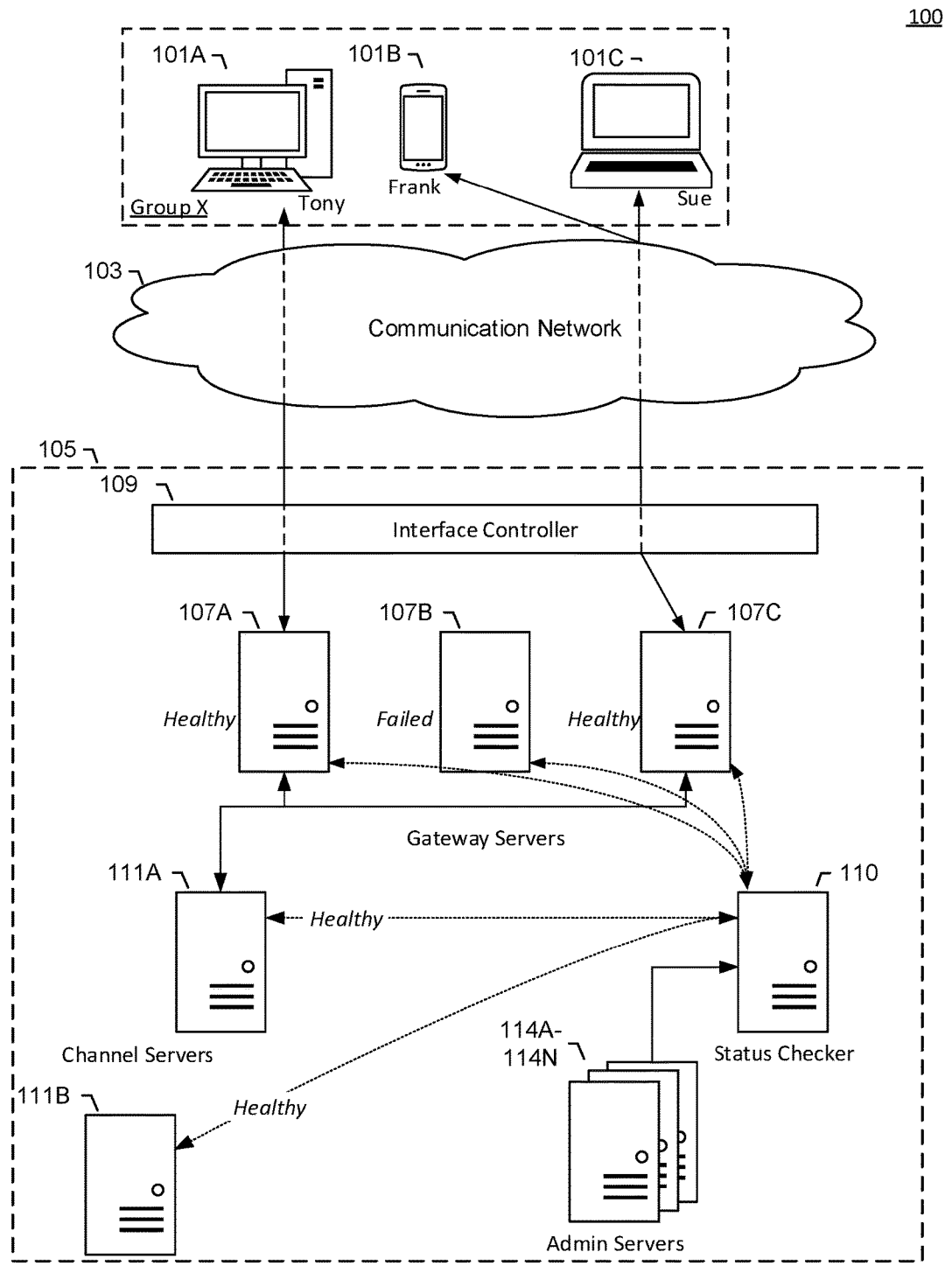

The one or more client devices 101A-101N are configured to generate and exchange data within group-based communication channels generated and operated via the group-based communication platform 105 and associated with a particular group. As an example, users "Tony," "Frank," and "Sue," each operating via respective client devices 101A-101C may be in communication via a common group-based communication channel associated with a particular group—"Group X" as shown in FIG. 7. Initially, Tony, Frank, and Sue are all connected via a first subset of all available gateway servers 107A-107N, the first subset of gateway servers encompassing gateway servers 107A and 107B of the group-based communication platform 105, with Tony connected to gateway server 107A, and both Frank and Sue connected with gateway server 107B. Under this initial configuration, Tony, Frank, and Sue all connect through the interface controller 109, which directs the users' respective client devices 101A-101C to the appropriate gateway server 107A-107B. These gateway servers 107A-107B within the first subset of gateway servers are in communication with first channel server 111A associated with the Group X channel as established based at least in part on a configuration key. As shown in FIGS. 7-8, the group-based communication platform further comprises a spare channel server 111B that is not in communication with any gateway servers 107A-107N. Although not shown in the examples of FIGS. 7-10, it should be understood that in certain embodiments, a single gateway server 107 supports a particular group-based communication channel. With reference to the examples of FIGS. 7-10, each of Tony, Frank, and Sue may communicate (via respective client devices 101A-101C) with a single gateway server 107 (e.g., first gateway server 107A), which may be replaced within a production environment as needed upon determining that the single gateway server 107 exhibits failing health characteristics.

Moreover, all of the channel servers 111A-111B are monitored by status checker 110, which compiles data indicative of the health of each of the monitored servers for review by the admin servers 114A-114N. The gateway servers 107A-107C and channel servers 111A-111B are configured to retrieve and/or receive configuration keys stored in association with the status checker 110. The configuration keys are generated and/or maintained by the admin servers 114A-114B to direct communications between and among the various computing entities. Thus, in this initial configuration shown in FIG. 7, the initial configuration key indicates that the Group X channel is maintained via the first channel server 111A and accordingly the first subset of gateway servers 107A-107B is in communication with the first channel server 111A. Moreover, in such embodiments, the single gateway server 107 may remain in communication with the single channel server 111 for indexing and storage of exchanged messages.

As mentioned above, the interface controllers 109 and gateway servers 107A-107B may be located in geographically distributed locations, thereby providing for "edge" processing of communications provided to and/or from the various client devices 101A-101C. In such embodiments, both the interface controllers 109 and gateway servers 107A-107B assigned to various client devices 101A-101C may be identified based on various characteristics of the gateway servers 107A-107B, the interface controllers 109, and the client devices 101A-101C. For example, edge computing environments (including both interface controllers 109 and gateway servers 107A-107B) may be selected for individual client devices 101A-101C to satisfy location/geographic criteria (e.g., selecting an edge computing environment that is locationally closest to the particular client device 101), utilization criteria (e.g., selecting an edge computing environment having available processing power), and/or the like.

These edge-based gateway servers 107A-107B are in communication with a centrally-located first channel server 111A, which is in further communication with other centrally-located computing entities, such as the status checker 110.

Referring back to the Tony/Frank/Sue example, Tony's client device 101A connects to a first gateway server 107A located geographically proximate to Tony's location (e.g., via an interface controller 109 that is similarly located), and both Frank and Sue's client devices 101B-101C connect to a second gateway server 107B that is located geographically proximate to the location of both Frank and Sue (e.g., through a similarly located interface controller 109). Each of the first gateway server 107A and second gateway server 107B are in communication with the first channel server 111A, which in turn stores messages exchanged via the Group X channel in a database (not shown). Thus, when exchanging messages within Group X (on an associated group-based communication channel), Tony receives messages replicated to the first gateway server 107A, and both Frank and Sue receive messages replicated to the second gateway server 107B. This creates a group affinity for the first subset of gateway servers 107A-107B involved in the exchange of messages among members of Group X. In the illustrated embodiment, the gateway servers 107A-107B within the first subset of gateway servers are the only gateway servers 107 involved in the exchange of messages on the group-based communication channel associated with Group X, and other gateway servers 107N (not shown in FIG. 7) may have a group affinity for other groups not reflected in the illustration.

Although not shown, individual client devices 101A-101N may be connected with a plurality of gateway servers 107A-107N (e.g., via one or a plurality of interface controllers 109) to enable message exchanges within a plurality of groups. For example, Tony's client device 101A (from the example above) may be connected with the first gateway server 107A for message exchange within Group X, and may be connected with a separate gateway server 107N for message exchange within a not-shown Group Y.

With reference again to the Tony/Frank/Sue example, messages exchanged among members of Group X are replicated across the associated group-based communication channel as reflected within all of the gateway servers 107A-107B having affinity for Group X. For example, upon receipt of a message destined for exchange among Group X participants, the interface controller 109 may be configured to parse metadata transmitted with the message, determine the appropriate group-based communication channel (e.g., associated with Group X) and/or gateway servers 107A-107N for the message, and to copy and transmit the message to all of the gateway servers 107A-107N having an affinity for the particular group. Once each gateway server 107A-107B receives the message, each gateway server 107A-107B transmits the message to client devices 101A-101C identified as being within the relevant group and connected with the particular gateway server 107. Thus, the first gateway server 107A transmits the message to Tony's client device 101A, and the second gateway server 107B transmits the message to both Frank's and Sue's client devices 101B-101C.

Moreover, upon receipt of messages, the gateway servers 107A-107N transmit those messages to a channel server 111 corresponding to the particular channel on which the message is exchanged. The channel server 111 corresponding to the particular channel is established via the configuration key generated an/or maintained by an admin server 114, based at least in part on health characteristics generated by a status checker 110.

The mentioned configuration key utilized by the gateway servers 107A-107N to direct data to the appropriate channel server (e.g., first channel server 111A) is generated, maintained, and provided by an admin server 114 based at least in part on data compiled by a status checker 110. The configuration key may be utilized to map particular channels to corresponding channel servers 111A-111N, and accordingly the gateway servers 107A-107N communicate with channel servers 111A-111N in accordance with relationships established based at least in part on the configuration key.

Status checker 110 is configured for monitoring the health and utilization of the various channel servers 111A-111N (e.g., by receipt of self-diagnosis data generated by the channel servers 111A-111N, by performing one or more health checks via data transfer to/from channel servers 111A-111N, and/or the like). The status checker 110 thus compiles data indicative of the health of various computing entities, including channel servers 111A-111N and/or admin servers 114A-114N. This data may be retrieved by the one or more admin servers 114A-114N (e.g., periodically, in real-time upon detection of updates to the data, and/or the like) such that the admin servers 114A-114N may each store a listing of healthy (active) and unhealthy (failed) channel servers 111A-111N, together with health indications for each of the listed computing entities. Upon detecting that the status checker 110 comprises data indicating that one or more channel servers 111A-111N exhibit failing health characteristics (and therefore the stored listing of the admin servers 114A-114N reflect these failing health characteristics), the one or more admin servers 114A-114N execute a programming module containing an algorithm for updating the configuration key to remove the failing channel server from a channel (e.g., having group affinity for a particular group), and to reallocate the data transfer load to other, healthy channel servers. To update the configuration key, each of the one or more admin servers 114A-114N attempts to establish a lock with the configuration key stored via the status checker 110 to enable updates to the configuration key. Although only one admin server 114 updates the configuration key at a time (e.g., the single admin server 114 that successfully establishes a lock with the configuration key), providing a plurality of admin servers 114A-114N in the group-based communication platform 105 ensures the admin servers successfully update configuration key, even if one of the admin servers 114 fails.

Failed channel servers 111A-111N may be replaced with healthy channel servers 111A-111N via updates to the configuration key. In certain embodiments, an admin server 114 updating the configuration key may randomly select a healthy channel server 111 not currently in production to replace a failed channel server 111. However, in certain embodiments, the healthy channel server 111 may be selected as a replacement for a failed channel server 111 based at least in part on characteristics of the healthy channel server 111 (e.g., utilization characteristics, performance characteristics, and/or the like). The updated configuration key is then provided to the plurality of gateway servers 107A-107N to direct messages from the gateway servers 107A-107N to appropriate channel servers 111A-111N corresponding to particular channels.

Continuing the Tony/Frank/Sue example, upon the interface controller 109 identifying the second gateway server 107B as failing (e.g., the interface controller 109 may no longer detect the presence of the second gateway server 107B), the interface controller 109 replaces the second gateway server 107B with a third gateway server 107C (as reflected in FIG. 8) thereby associating the Group X group-based communication channel with a second subset of gateway servers encompassing the first gateway server 107A and the third gateway server 107C, such that messages destined for Frank and Sue's client devices 101B-101C within the group-based communication channel associated with Group X are routed through the third gateway server 107C to maintain connectivity within the group.

As reflected at both FIGS. 7-8, the first channel server 111A remains healthy, and therefore the updated configuration key carried out as indicated at FIG. 8 does not change the channel server configuration.

Figure 9:
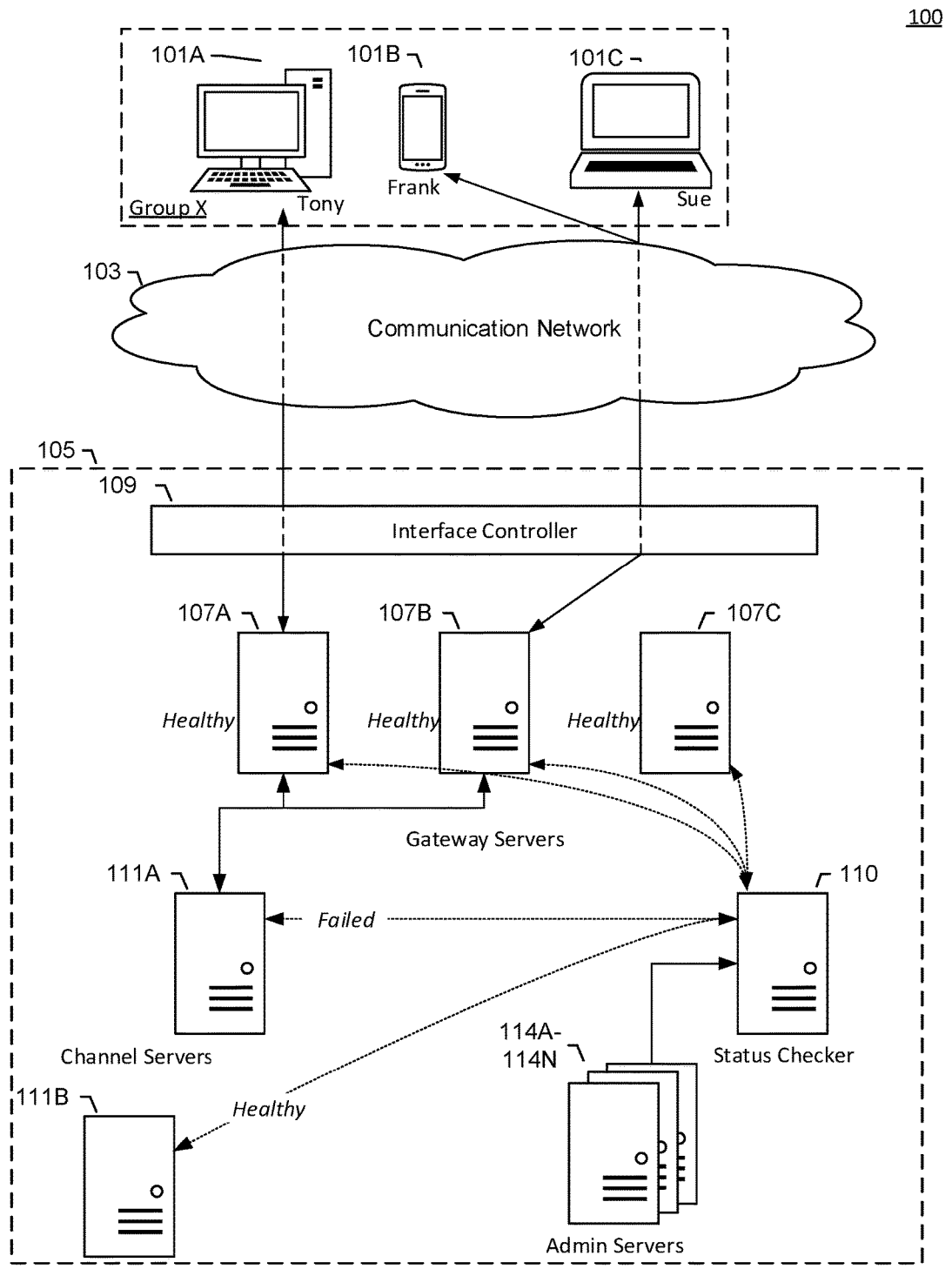
Figure 10:
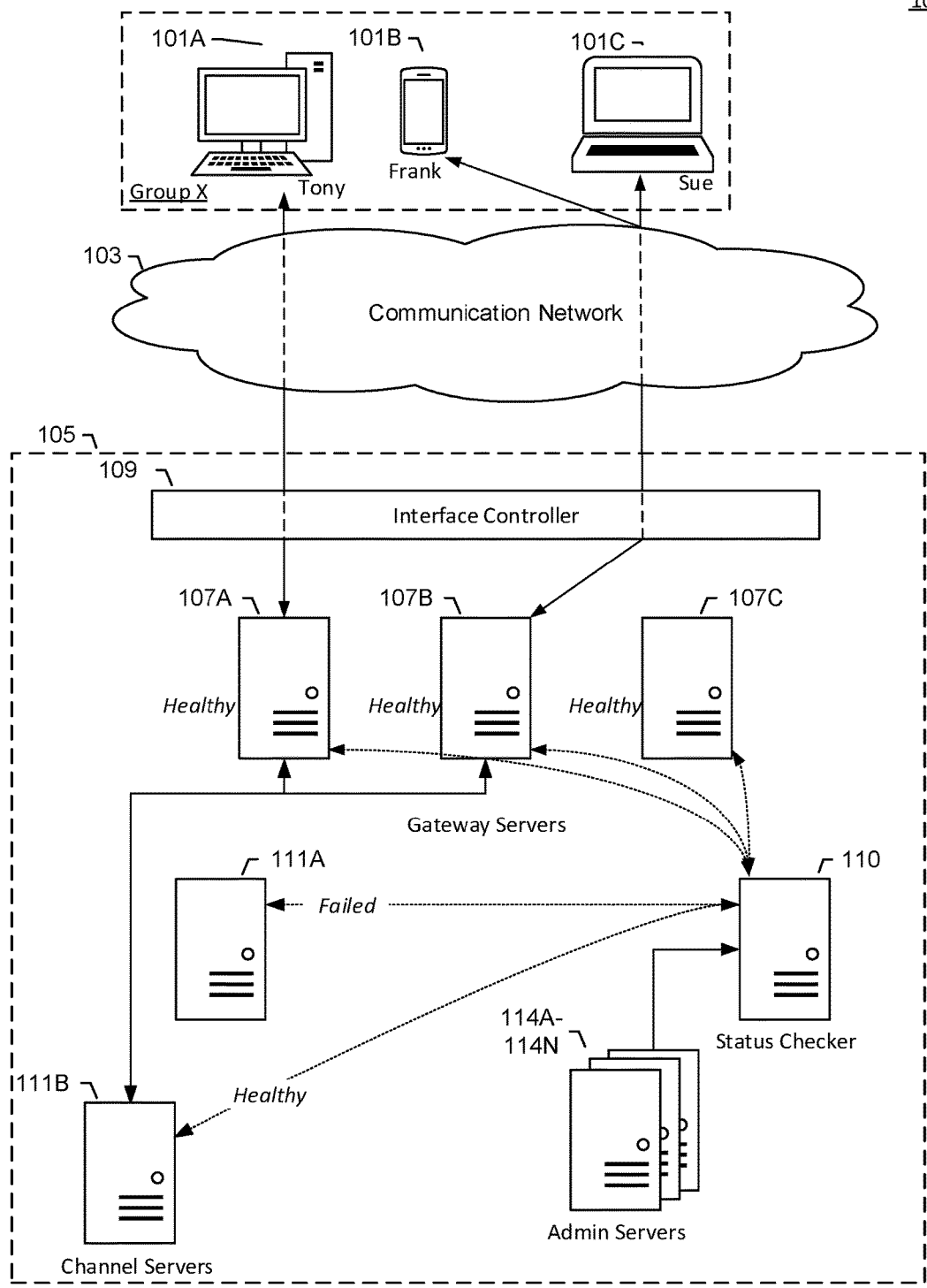

FIGS. 9-10 illustrate another example configuration of electronic information exchange among client devices 101A-101C corresponding to Tony, Frank, and Sue across the Group X channel. Initially, the configuration is identical to the initial configuration reflected in FIG. 7 discussed above, with Tony connected to gateway server 107A through interface controller 109, and both Frank and Sue connected with gateway server 107B through interface controller 109. These gateway servers 107A-107B are further in communication with first channel server 111A assigned to the Group X channel as indicated in the initial configuration key carried out as shown in FIG. 9.

Notably different from FIG. 7, however, is gateway server 107B remains healthy as indicated at FIG. 9, while the first channel server 111A (initially assigned as the Group X channel server in accordance with an initial configuration key) exhibits unhealthy characteristics, as monitored by the status checker 110. The status checker 110 determines the unhealthy characteristics of the first channel server 111A while monitoring each of the gateway servers 107A-107N, channel servers 111A-111N, and admin servers 114A-114N. Once the status checker 110 compiles data indicative of the unhealthy characteristics of the first channel server 111A, each of the admin servers 114A-114N attempts to establish a lock on the configuration key to update the data therein. Once a single admin server 114 establishes a lock (e.g., first admin server 114A), the admin server updates the configuration key to take the unhealthy first channel server 111A out of use, and adds the spare, second channel server 111B into the production environment in place of the removed unhealthy channel server 111B. The admin server then releases the lock on the configuration key, thereby making it available to the interface controller 109, gateway servers 107A-107N, channel servers 111A-111N, and/or other admin servers. The gateway servers 107A-107B associated with the Group X channel determine that first channel server 111A is no longer in the production environment, as indicated by the updated configuration key, and the gateway servers 107A-107B update their subscription to the second channel server 111B, as indicated at FIG. 10. As discussed herein, the various gateway servers 107A-107B and second channel server 111B utilize time stamp data for messages exchanged among the Group X channel to identify data that needs to be synchronized across the computing entities associated with the Group X channel.

The redundancy of a plurality of admin servers 114A-114B attempting to establish a lock and update the configuration key ensures proper functionality of the gateway server and channel server levels of message exchange (in accordance with updates to the configuration key) and also ensure proper functionality of the admin server level for updating the configuration key, since a properly functioning admin server will establish the lock and update the configuration key. Unhealthy, or otherwise improperly functioning admin servers 114A-114N are incapable of establishing a lock with the configuration key, and therefore other, healthy admin servers 114A-114N establish the lock and update the configuration key.

The updated configuration key may be applied indefinitely, or it may be applicable only while a particular channel server is deemed unhealthy. In certain embodiments, once the status checker 110 determines that a previously failing channel server has returned to normal functionality, the admin servers 114A-114B may replace the edited configuration key with the original configuration key to be made available to the one or more gateway servers 107A-107C to return the group-based communication platform 105 to an initial operational state.

Example Apparatuses Utilized with Various Embodiments

Figure 2:
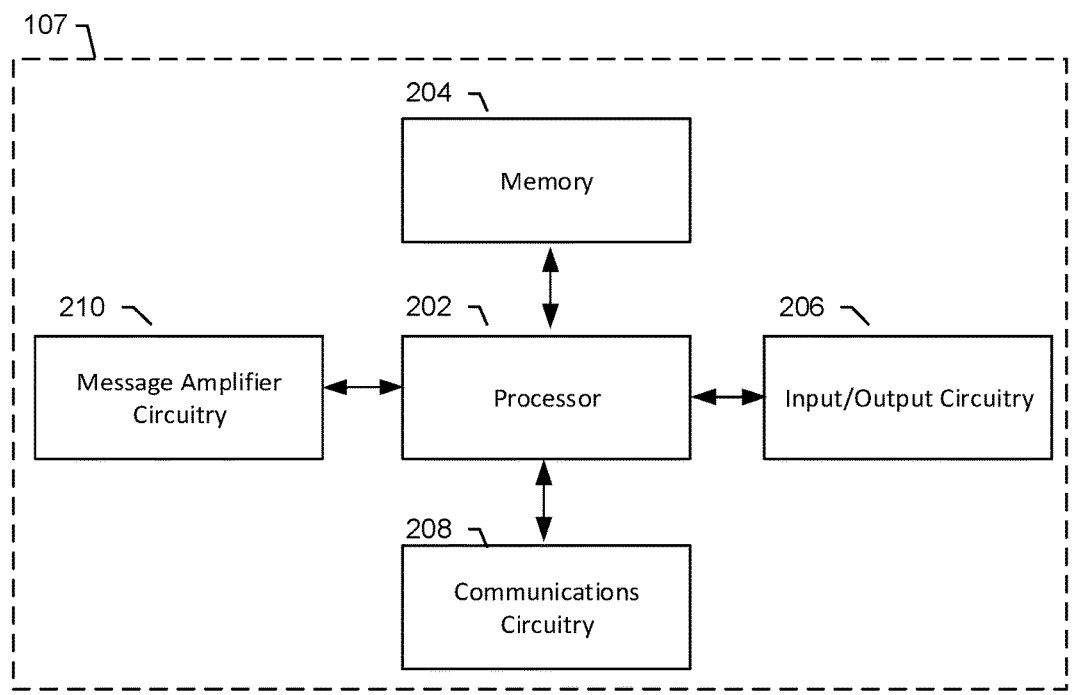
FIG. 2 shows a schematic of an example hardware apparatus of a gateway server according to one embodiment.

Each gateway server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described above with respect to FIG. 1 and below with respect to FIGS. 7-10. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices to other client devices based on the database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
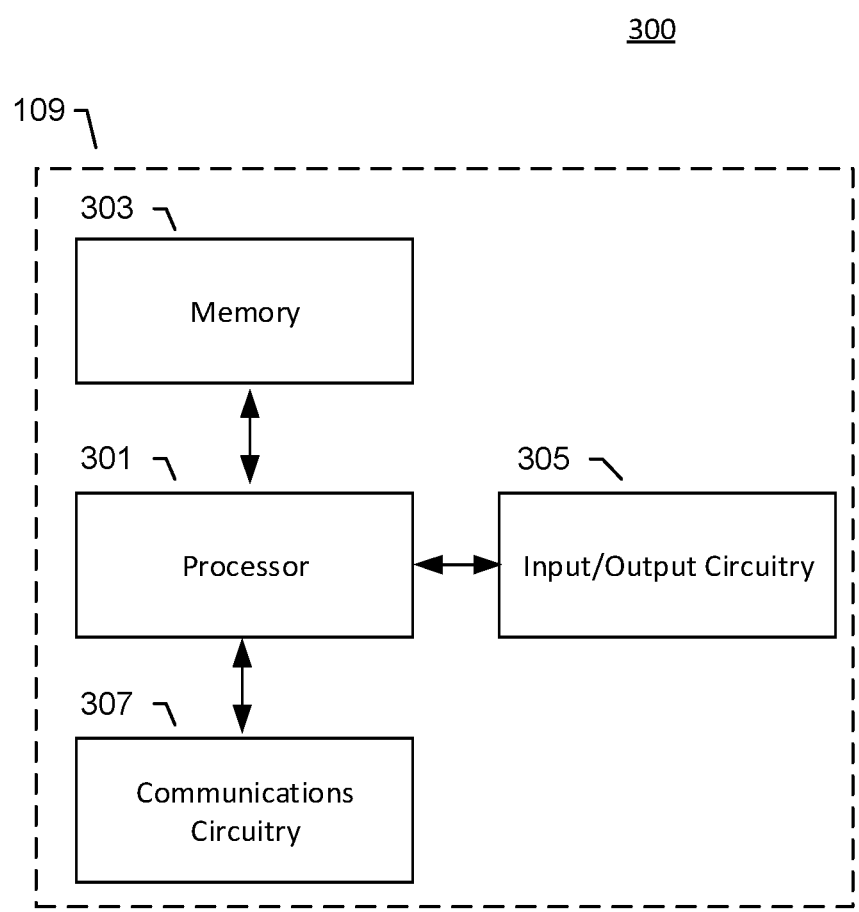
FIG. 3 shows a schematic of an example hardware apparatus of an interface controller according to one embodiment.

In the illustrated embodiment of FIG. 3, the interface controller 109 is embodied by one or more computing systems encompassing apparatus 300. The illustrated apparatus 300 includes processor 301, memory 303, input/output circuitry 305, and communications circuitry 307. The apparatus 300 may be configured to execute the operations described above with respect to FIG. 1 and below with respect to FIGS. 7-10. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or coprocessor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Moreover, although the interface controller 109 is shown within the bounds of the group-based communication platform 105, it should be understood that the interface controller 109 may be embodied as an edge-based computing device in communication with aspects of the group-based communication platform 105 via a communication network 103. Such embodiments may comprise a plurality of interface controllers 109 that are geographically distributed, and such interface controllers 109 may be configured for communicating with client devices 101 within a geographic range proximate a respective interface controller 109.

Figure 4:
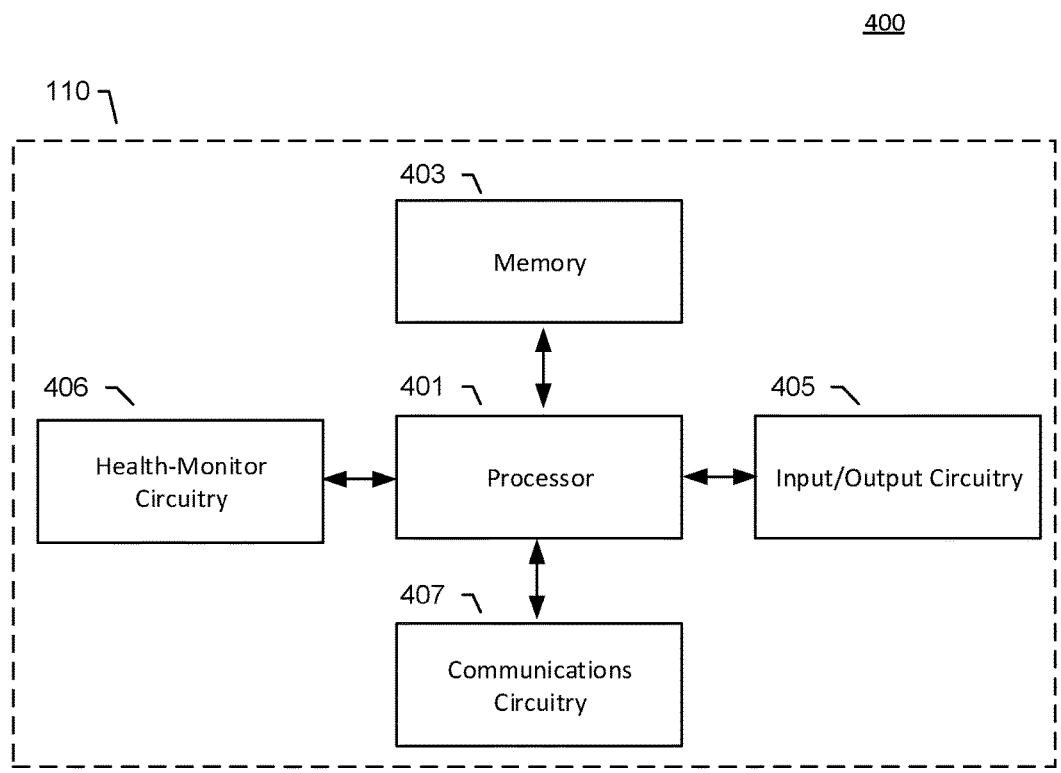
FIG. 4 shows a schematic of an example hardware apparatus of a status checker system according to one embodiment.

In the illustrated embodiment of FIG. 4, the status checker 110 is embodied as one or more computing systems encompassing apparatus 400. The illustrated apparatus 400 includes processor 401, memory 403, input/output circuitry 405, and health-monitor circuitry 406, communications circuitry 407. The apparatus 400 may be configured to execute the operations described above with respect to FIG. 1 and below with respect to FIGS. 7-8. Although these components 401-407 are described with respect to functional limitations, it should be understood that the particular implementations necessarily include the use of particular hardware. It should also be understood that certain of these components 401-407 may include similar or common hardware. For example, two sets of circuitries may both leverage use of the same processor, network interface, storage medium, or the like to perform their associated functions, such that duplicate hardware is not required for each set of circuitries. Moreover, in certain embodiments, aspects of the status checker 110 may be coextensive with other computing entities.

In some embodiments, the processor 401 (and/or co-processor or any other processing circuitry assisting or otherwise associated with the processor) may be in communication with the memory 403 via a bus for passing information among components of the apparatus. The memory 403 is non-transitory and may include, for example, one or more volatile and/or non-volatile memories. In other words, for example, the memory 403 may be an electronic storage device (e.g., a computer-readable storage medium). The memory 403 may be configured to store information, data, content, applications, instructions, or the like for enabling the apparatus 400 to carry out various functions in accordance with example embodiments of the present invention. For example, the memory 403 may be configured to store configuration keys that may be provided to an interface controller as needed.

The processor 401 may be embodied in a number of different ways and may, for example, include one or more processing devices configured to perform independently. In some preferred and non-limiting embodiments, the processor 401 may include one or more processors configured in tandem via a bus to enable independent execution of instructions, pipelining, and/or multithreading.

In some preferred and non-limiting embodiments, the processor 401 may be configured to execute instructions stored in the memory 403 or otherwise accessible to the processor 401. In some preferred and non-limiting embodiments, the processor 401 may be configured to execute hard-coded functionalities. As such, whether configured by hardware or software methods, or by a combination thereof, the processor 401 may represent an entity (e.g., physically embodied in circuitry) capable of performing operations according to an embodiment of the present invention while configured accordingly. Alternatively, as another example, when the processor 401 is embodied as an executor of software instructions, the instructions may specifically configure the processor 401 to perform the algorithms and/or operations described herein when the instructions are executed.

As just one example, the processor 401 may be configured to monitor health characteristics of various channel servers 111 based on data received and/or generated via the health-monitor circuitry 406. The processor 401 may be configured to receive self-diagnosis data from various channel servers 111 at scheduled times (e.g., every 20 seconds), may be configured to transmit "ping" signals to various channel servers 111 via the health-monitor circuitry 406 to monitor response times of the channel servers 111, and/or the like. The processor 401 may be further configured to automatically generate and/or update configuration keys (e.g., as stored in memory 403) based on the health characteristics of various channel servers 111A-111N, and to transmit the configuration keys to the gateway servers 107A-107N as needed.

In some embodiments, the apparatus 400 may include input/output circuitry 405 that may, in turn, be in communication with processor 401 to provide output to the user and, in some embodiments, to receive an indication of a user input. The input/output circuitry 405 may comprise a user interface and may include a display, and may comprise a web user interface, a mobile application, a client device, a kiosk, or the like. In some embodiments, the input/output circuitry 405 may also include a keyboard, a mouse, a joystick, a touch screen, touch areas, soft keys, a microphone, a speaker, or other input/output mechanisms. Although the processor 400 is configured for automatic generation and/or updating of configuration keys as discussed herein, the input/output circuitry 405 may enable users (e.g., administrators) to manually adjust and/or generate configuration keys via the status checker 110.

The health-monitor circuitry 406 may comprise one or more communication interfaces configured for receiving and/or transmitting data to various channel servers 111 (or other computing devices) to enable the health-monitoring circuitry 406 to monitor the relative health and/or performance of those computing entities. The health-monitoring circuitry 406 may comprise any number of hardware and/or software components for monitoring, receiving, and/or generating health characteristics indicative of the relative performance of various computing devices, such that the processor 401 may determine whether a particular computing device is functioning properly or whether the computing device should be removed from network communications with other aspects of the described system.

The communications circuitry 407 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 407 may include, for example, a network interface for enabling communications with a wired or wireless communication network. For example, the communications circuitry 407 may include one or more network interface cards, antennae, buses, switches, routers, modems, and supporting hardware and/or software, or any other device suitable for enabling communications via a network. Additionally or alternatively, the communications circuitry 407 may include the circuitry for interacting with the antenna/antennae to cause transmission of signals via the antenna/antennae or to handle receipt of signals received via the antenna/antennae.

Figure 5:
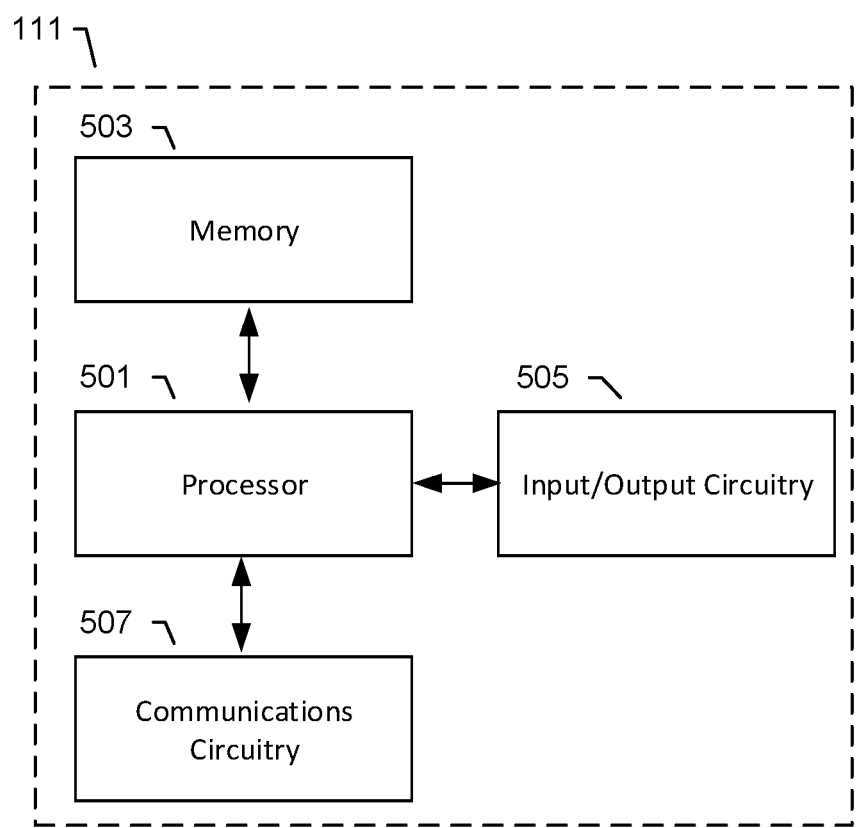
FIG. 5 shows a schematic of an example hardware apparatus of a channel server according to one embodiment.

In the illustrated embodiment of FIG. 5, the channel servers 111A-111N are embodied by one or more computing systems encompassing apparatus 500. The illustrated apparatus 500 has a configuration substantially similar to the apparatus 300 described in reference to gateway servers 107A-107N, and may include processor 501, memory 503, input/output circuitry 505, communications circuitry 507, and/or the like. The apparatus 500 may be configured to execute the operations described above with respect to FIG. 1 and below with respect to FIGS. 7-10. Although components 501-507 are described with respect to functional limitations, it should be understood that the particular implementations necessarily include the use of particular hardware. It should also be understood that certain of these components 501-507 may include similar or common hardware. For example, two sets of circuitries may both leverage use of the same processor, network interface, storage medium, or the like to perform their associated functions, such that duplicate hardware is not required for each set of circuitries.

In some embodiments, the processor 501 (and/or co-processor or any other processing circuitry assisting or otherwise associated with the processor) may be in communication with the memory 503 via a bus for passing information among components of the apparatus. The memory 503 is non-transitory and may include, for example, one or more volatile and/or non-volatile memories. In other words, for example, the memory 503 may be an electronic storage device (e.g., a computer-readable storage medium). The memory 503 may be configured to store information, data, content, applications, instructions, or the like for enabling the apparatus 500 to carry out various functions in accordance with example embodiments of the present invention.

For example, the memory 503 may be configured to cache messages exchanged on one or more group-based communication channels, such that the processor 501 may provide various messages to client devices (e.g., on an as needed or as requested basis).

The processor 501 may be embodied in a number of different ways and may, for example, include one or more processing devices configured to perform independently. In some preferred and non-limiting embodiments, the processor 501 may include one or more processors configured in tandem via a bus to enable independent execution of instructions, pipelining, and/or multithreading.

In some preferred and non-limiting embodiments, the processor 501 may be configured to execute instructions stored in the memory 503 or otherwise accessible to the processor 501. In some preferred and non-limiting embodiments, the processor 501 may be configured to execute hard-coded functionalities. As such, whether configured by hardware or software methods, or by a combination thereof, the processor 501 may represent an entity (e.g., physically embodied in circuitry) capable of performing operations according to an embodiment of the present invention while configured accordingly. Alternatively, as another example, when the processor 501 is embodied as an executor of software instructions, the instructions may specifically configure the processor 501 to perform the algorithms and/or operations described herein when the instructions are executed.

As just one example, the processor 501 may be configured to maintain one or more group-based communication channels connecting a plurality of client devices 101A-101N to enable message sharing therebetween. The processor 501 ensures that gateway servers 107A-107N associated with client devices 101A-101N within a particular group-based communication channel receive messages intended for exchange between the client devices 101 within the particular group-based communication channel.

Moreover, the processor 501 may be configured to synchronize messages exchanged on a particular group-based communication channel with a database for storage and/or indexing of messages therein. In certain embodiments, the processor 501 may provide stored and/or indexed messages to one or more gateway servers 107A-107N to synchronize messages stored within the database but not provided for dissemination to client devices 101A-101N via a respective gateway server 107. Such functionality may enable the processor 501 to provide reminder messages and/or scheduled messages to be disseminated within a group-based communication channel, wherein the reminder messages are provided to the channel server 111 processors 501 for dissemination on a group-based communication channel at a desired date and/or time. These reminder messages and/or scheduled messages may be provided from a message server (not shown) configured for generation and/or storage of messages to be disseminated at a desired future date and/or time.

In some embodiments, the apparatus 500 may include input/output circuitry 505 that may, in turn, be in communication with processor 501 to provide output to the user and, in some embodiments, to receive an indication of a user input. The input/output circuitry 505 may comprise a user interface and may include a display, and may comprise a web user interface, a mobile application, a client device, a kiosk, or the like. In some embodiments, the input/output circuitry 505 may also include a keyboard, a mouse, a joystick, a touch screen, touch areas, soft keys, a microphone, a speaker, or other input/output mechanisms.

The communications circuitry 507 may be any means such as a device or circuitry embodied in either hardware or a combination of hardware and software that is configured to receive and/or transmit data from/to a network and/or any other device, circuitry, or module in communication with the apparatus 500. In this regard, the communications circuitry 507 may include, for example, a network interface for enabling communications with a wired or wireless communication network. For example, the communications circuitry 507 may include one or more network interface cards, antennae, buses, switches, routers, modems, and supporting hardware and/or software, or any other device suitable for enabling communications via a network. Additionally or alternatively, the communications circuitry 507 may include the circuitry for interacting with the antenna/antennae to cause transmission of signals via the antenna/antennae or to handle receipt of signals received via the antenna/antennae.

Figure 6:
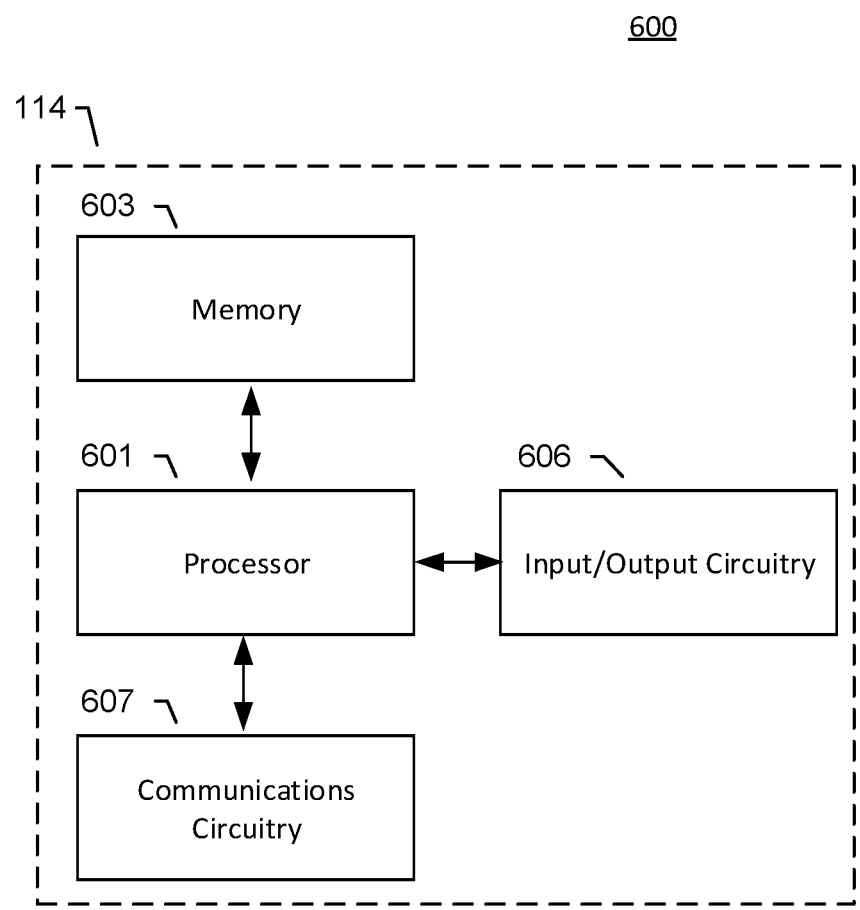
FIG. 6 shows a schematic of an example hardware apparatus of an admin server according to one embodiment.

In the illustrated embodiment of FIG. 6, the admin servers 114A-114N are embodied by one or more computing systems encompassing apparatus 600. The illustrated apparatus 600 has a configuration substantially similar to the apparatus 300 described in reference to gateway servers 107A-107N, and may include processor 601, memory 603, input/output circuitry 605, communications circuitry 607, and/or the like. The apparatus 600 may be configured to execute the operations described above with respect to FIG. 1 and below with respect to FIGS. 7-10. Although these components 601-607 are described with respect to functional limitations, it should be understood that the particular implementations necessarily include the use of particular hardware. It should also be understood that certain of these components 601-607 may include similar or common hardware. For example, two sets of circuitries may both leverage use of the same processor, network interface, storage medium, or the like to perform their associated functions, such that duplicate hardware is not required for each set of circuitries.

In some embodiments, the processor 601 (and/or co-processor or any other processing circuitry assisting or otherwise associated with the processor) may be in communication with the memory 603 via a bus for passing information among components of the apparatus. The memory 603 is non-transitory and may include, for example, one or more volatile and/or non-volatile memories. In other words, for example, the memory 603 may be an electronic storage device (e.g., a computer-readable storage medium). The memory 603 may be configured to store information, data, content, applications, instructions, or the like for enabling the apparatus 603 to carry out various functions in accordance with example embodiments of the present invention. For example, the memory 603 may be configured to cache data indicative of health characteristics of various computing entities, such that the processor 601 may update a configuration key as needed.

The processor 601 may be embodied in a number of different ways and may, for example, include one or more processing devices configured to perform independently. In some preferred and non-limiting embodiments, the processor 601 may include one or more processors configured in tandem via a bus to enable independent execution of instructions, pipelining, and/or multithreading.

In some preferred and non-limiting embodiments, the processor 601 may be configured to execute instructions stored in the memory 603 or otherwise accessible to the processor 601. In some preferred and non-limiting embodiments, the processor 601 may be configured to execute hard-coded functionalities. As such, whether configured by hardware or software methods, or by a combination thereof, the processor 601 may represent an entity (e.g., physically embodied in circuitry) capable of performing operations according to an embodiment of the present invention while configured accordingly. Alternatively, as another example, when the processor 601 is embodied as an executor of software instructions, the instructions may specifically configure the processor 601 to perform the algorithms and/or operations described herein when the instructions are executed.

As just one example, the processor 601 may be configured to maintain a configuration key mapping communications to and/or from the various gateway servers 107A-107N and/or channel servers 111A-111N. The configuration key may not be stored locally on any of the admin servers 114A-114N, but instead may be stored in a memory associated with the status checker 110. In this regard, a plurality of admin servers 114A-114N, in the alternative, may thereby maintain the configuration key by first establishing a lock between a single admin server's processor 601 and the configuration key (to prevent other admin servers 114A-114N from simultaneously modifying the contents of the configuration key), and then updating the configuration key as needed to ensure proper functionality of the group-based communication platform 105 (e.g., by replacing unhealthy channel servers 111A-111N with healthy counterparts).

In some embodiments, the apparatus 600 may include input/output circuitry 605 that may, in turn, be in communication with processor 601 to provide output to the user and, in some embodiments, to receive an indication of a user input. The input/output circuitry 605 may comprise a user interface and may include a display, and may comprise a web user interface, a mobile application, a client device, a kiosk, or the like. In some embodiments, the input/output circuitry 605 may also include a keyboard, a mouse, a joystick, a touch screen, touch areas, soft keys, a microphone, a speaker, or other input/output mechanisms.

The communications circuitry 607 may be any means such as a device or circuitry embodied in either hardware or a combination of hardware and software that is configured to receive and/or transmit data from/to a network and/or any other device, circuitry, or module in communication with the apparatus 600. In this regard, the communications circuitry 607 may include, for example, a network interface for enabling communications with a wired or wireless communication network. For example, the communications circuitry 607 may include one or more network interface cards, antennae, buses, switches, routers, modems, and supporting hardware and/or software, or any other device suitable for enabling communications via a network. Additionally or alternatively, the communications circuitry 607 may include the circuitry for interacting with the antenna/antennae to cause transmission of signals via the antenna/antennae or to handle receipt of signals received via the antenna/antennae.

The term "circuitry" should be understood broadly to include hardware and, in some embodiments, software for configuring the hardware. With respect to components of each apparatus 200, 300, 400, 500, 600, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like. Aspects of apparatuses 400-600 may provide similar functionality.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

As mentioned, various embodiments provide automatic load balancing among aspects of a group-based communication platform 105 to optimize the system performance as experienced by end users via respective client devices 101A-101N. In certain embodiments, distributing various processes described herein with geographically remote, "edge" computing environments increases performance as experienced by end users. Thus, although the group-based communication platform 105 is illustrated and sometimes described as being located entirely at a centralized location, it should be understood that certain components may be distributed to be geographically closer to end users' client devices 101A-101N to decrease latency in messaging exchange that may otherwise be experienced as undesirable "lag" when presenting messages or other data at individual client devices 101A-101N. As just one example, the group-based communication platform 105 may comprise a plurality of edge-based interface controllers 109 that are client device-facing to decrease transmission time between the individual client devices 101A-101N and the group-based communication platform 105 (the interface controllers 109 may also operate to cache data prior to providing the same to client devices to decrease the latency experienced at the client devices 101). The edge computing entities may also comprise one or more gateway servers 107A-107N, which have user-specific affinity (such that a single user is in communication with a single gateway server 107, in general or within a particular group) to decrease latency in message communication between the gateway servers 107 and respective client devices 101.

In certain embodiments, other components, such as channel servers 111A-111N administering message exchange within group-based communication channels associated with individual groups, status checkers 110, admin servers 114A-114N, and/or other group-based communication platform 105 components may be located at a centralized location. From the centralized location, the admin servers 114A-114N provide server management functionalities based at least in part on health characteristics of various channel servers 111A-111N to ensure proper functionality of the group-based communication platform 105 from the perspective of the client devices 101A-101N.

Data flows enabling automatic load distribution among a plurality of gateway servers 107A-107N and channel servers 111A-111N based on the relative health (and/or other characteristics) of those gateway servers 107A-107N and channel servers 111A-111N as illustrated by the Tony/Frank/Sue example illustrations of FIGS. 7-8 will now be described in detail.

Individual messages for exchange within a group-based communication channel among users of Group X (as illustrated in FIGS. 7-10) are generated at one or more of the client devices 101A-101C. For example, Tony may generate and send a "Good Morning" message including an emoji and an .mp4 video file attachment from his client device 101A (e.g., via a group-based communication interface) to the client devices 101B-101C of Frank and Sue—the other members of Group X. Tony's client device 101A appends various metadata to the message, including a sender ID (identifying Tony as the sender of the message), a channel identifier (identifying the group-based communication channel associated with Group X), and/or other information regarding the message (e.g., the time/date of generation, whether it is a new message or a nested "response" message to an existing message, and/or the like). Tony's Good Morning message is sent through the communication network 103 to the interface controller 109 for introduction to the group-based communication platform 105. The interface controller 109 parses the message, attachment, and metadata to identify routing instructions for the message to ensure delivery to the appropriate recipients. Specifically, the interface controller 109 parses the metadata to retrieve the channel identifier included with the message (e.g., a channel identifier identifying the Group X group-based communication channel). The interface controller 109 then identifies gateway servers 107A-107B having a group affinity with Group X for distribution of the message. These gateway servers 107A-107B with group affinity to Group X are identified as a first subset of all available gateway servers 107A-107N. Once the interface controller 109 identifies the appropriate gateway servers 107A-107B having an affinity for Group X, the interface controller 109 transmits the message (including content, attachments, and at least a portion of the metadata) to the subset of gateway servers 107A-107N (e.g., gateway servers 107A-107B) having affinity for Group X.

In certain embodiments, the interface controller 109 may establish group affinity according to an established algorithm operating via the interface controller 109. The algorithm may establish a minimum number of gateway servers 107A-107N for a group affinity (e.g., at least two) a maximum number of gateway servers 107A-107N for a group affinity (e.g., one less than the total number of available gateway servers 107A-107N), and may establish priority for individual gateway servers 107A-107N to be included within the subset of gateway servers having a particular group affinity based on characteristics of the gateway servers 107A-107N and/or characteristics of the client devices 101A-101N included within the group. Including more than one gateway server 107A-107N in the message exchange within a group may minimize the impact of a malfunctioning gateway server 107 on the distribution of messages within groups connected with the malfunctioning gateway server 107. Moreover, as will be evident from additional disclosure below, providing a maximum number of gateway servers 107A-107N for affinity with a particular group, and setting that maximum number as being less than the total number of available gateway servers 107A-107N enables group-based affinity to be modified to substitute various gateway servers in the event that one or more gateway servers 107A-107N malfunctions.

As an example, group affinity may be established based on location/geographic characteristics (e.g., selecting a gateway server 107 nearest one or more client devices 101A-101N within the group), utilization characteristics (e.g., selecting an underutilized gateway server 107 to distribute processing tasks among a plurality of gateway servers 107), and/or the like. However, in certain embodiments, group affinity may be established based at least in part on pre-established client device-affinity between individual client devices 101 and individual gateway servers 107A-107N, such that group-affinity is established as including all gateway servers 107A-107N having a pre-established client device-affinity for client devices 101A-101N included within the group.

With reference again to Tony's Good Morning message example, the message is transmitted within the group-based communication channel to all of the gateway servers 107A-107B having group-affinity for Group X, thereby replicating the message across all of those gateway servers 107A-107B such that those gateway servers 107A-107B each have a copy of the message stored thereon.

In certain embodiments, the gateway servers 107A-107B are in communication with a connected channel server 111A (selected from a plurality of channel servers 111A-111N) as established via the configuration key. Each group-based communication channel is assigned to a single channel server 111 to compile data regarding messages exchanged within the group and/or to store indexable data regarding the message exchange via database 115. The channel server 111A may be in communication with a storage database (not shown) for storing messages exchanged within the group for later reference, indexing, and recovery. Thus, the channel server 111A maintains synchronization with all of the gateway servers 107A-107B involved in message exchange within a particular group. Each gateway server 107A-107N accesses the configuration key (e.g., by storing a local copy of the configuration key on each gateway server 107A-107N), to map communications within various communication channels to particular channel servers 111A-111N. Thus, Tony's Good Morning message may be transmitted and synchronized with the channel server 111A as indicated via the configuration key, as well as gateway servers 107A-107B.

Tony's Good Morning message is disseminated from the gateway servers 107A-107B to the connected client devices 101A-101C within Group X. Specifically, gateway server 107B transmits copies of the Good Morning message to Frank and Sue's client devices 101B-101C via interface controller 109. As mentioned, interface controller 109 may cache copies of the Good Morning message for each of Frank and Sue's client devices 101B-101C, such that the message may be transmitted quickly to their client devices once the group-based communication interface is executed on the respective client devices 101B-101C.

With reference briefly to the organization of a group-based communications platform 105 managing a plurality of group-based communication channels between a plurality of client devices 101A-101N (which may overlap between groups, organizations, and/or the like). A single client device 101 may be involved in a plurality of groups, and each group may have an associated group-based communication channel operating via an associated subset of gateway servers 107A-107N having a group affinity for the particular group. Each gateway server 107 may have a client-device affinity for a plurality of client devices 101A-101N, and each gateway server 107 may have a group-affinity for a plurality of groups. Moreover, subsets of gateway servers 107A-107N involved with group affinity for a plurality of groups may overlap. For example, gateway servers 107A-107C may have group affinity for the example Group X described above, gateway servers 107B-107F (many of which are not shown) may have group affinity for a different group, Group Y, and gateway servers 107G-107K (not shown) may have group affinity for yet another group, Group Z.

Referencing FIGS. 7-8 again, each available channel server 111A-111N (including the channel server 111 having affinity for Group X and other channel servers 111A-111N) is in communication with a status checker 110 configured for monitoring health characteristics of the individual channel servers 111A-111N. The status checker 110 thus detects when a particular channel server 111 fails, malfunctions, or otherwise exhibits undesirable diminished performance characteristics. The individual channel servers 111A-111N may be configured for self-diagnosis for self-determining health characteristics to be provided to the status checker 110, and/or the status checker 110 may be configured to perform diagnostic communications with individual channel servers 111A-111N to determine health characteristics. For example, the status checker 110 may transmit pings or other data messages to channel servers 111N-111N to monitor response rates, dropped/missed data, and/or other health-related characteristics of the channel servers 111A-111N. The status checker 110 may be configured to periodically monitor health characteristics of channel servers 111A-111N according to a defined schedule (e.g., every 20 seconds, each minute, each hour, each day, and/or the like), based on pushed data received by the status checker 110 (e.g., health data pushed from individual channel servers 111), and/or the like. For example, the status checker 110 may expect to receive updated health data from each of the channel servers 111A-111N at defined intervals (e.g., every 20 seconds), and may determine that a particular channel server 111 is unhealthy if health characteristic data is not received from the channel server 111 according to the defined schedule.

The admin servers 114A-114N monitor the health data generated and/or received via the status checker 110 to ensure proper functionality of the group-based communication platform 105. Under normal operation, the status checker 110 stores an initial configuration key in a memory associated therewith, and that configuration key is accessible to the gateway servers 107A-107N, channel servers 111A-111N and/or admin servers 114A-114N. Each device having access to the configuration key may have defined access privileges. For example, the gateway servers 107A-107N and/or channel servers 111A-111N may have read only access to the configuration key, thereby enabling each of these computing devices to download respective copies of the configuration key (or portions of the configuration key). In certain embodiments, the memory associated with the status checker 110 may be configured to track which computing entities have accessed and/or downloaded the configuration key, to ensure that all computing entities in production are operating according to the proper configuration key.

Moreover, the admin servers 114A-114N may have read/write access to the configuration key, thereby enabling the admin servers 114A-114N to update the configuration key as needed to maintain proper functionality of the group-based communication platform 105. In certain embodiments, write access to the configuration key is limited to admin servers 114A-114N establishing a lock with the configuration key. The lock enables a single admin server 114 to modify the contents of the configuration key, while simultaneously preventing other admin servers 114A-114N from simultaneously establishing a lock and/or modifying the configuration key. Requiring a lock between the admin server and the configuration key enables a plurality of admin servers 114A-114N to be used with redundancy with minimal risk of generating conflicting versions of a configuration key. The redundancy within the plurality of admin servers 114A-114N ensures admin servers 114A-114N are available to update the configuration key even if one or more of the admin servers 114A-114N are determined to be unhealthy or otherwise not functioning property (e.g., unable to read health characteristic data compiled via the status checker).

The admin servers 114A-114N monitor the health characteristics of various channel servers 111A-111N as determined by the status checker 110. Upon determining that one or more channel servers 111 exhibit failing health characteristics (e.g., based on stored data indicative of acceptable health characteristics for gateway servers), the admin servers 114A-114N may be configured to generate an updated configuration key and/or modify the existing configuration key stored via the memory associated with the status checker 110.

Similarly, upon the interface controller 109 detecting failing health characteristics of a gateway server 107 (e.g., the gateway server 107 no longer being visible as an available gateway server 107 to the interface controller 109, the interface controller 109 may reallocate data loads previously associated with the failing gateway server 107 to other, healthy gateway servers 107.

In instances in which a failing gateway server 107 is removed from use and replaced by a healthy gateway server 107 (e.g., the processing requirements of the failing gateway server 107 are redistributed among a plurality of gateway servers 107A-107N), the interface controller 109 disseminates messages to a new gateway server 107 and/or a new subset of gateway servers 107A-107N as indicated in the updated configuration key, and channel servers 111A-111N receive message data from a different plurality of gateway servers 107A-107N.

In instances in which a first admin server 114A establishes a lock with a configuration key and updates the configuration key to remove a failing channel server 111 from production and to replace the failing channel server 111 with a healthy channel server 111 (or the processing requirements of the failing channel server 111 are redirected among a plurality of channel servers 111A-111N), the updated configuration key is made available to the gateway servers 107A-107N and/or channel servers 111A-111N (e.g., by transmitting the updated configuration key to the appropriate computing entities and/or enabling the appropriate computing entities to retrieve the configuration key) gateway servers 107A-107N update their channel server subscriptions (according to which messages exchanged on a channel are transmitted between gateway servers 107A-107N and respective channel servers 111A-111N) to reflect changes to the channel server 111 servicing a particular channel.

As example instances in which a channel server 111 is determined to exhibit failing health characteristics, the group-based communication platform 105 may comprise one or more spare channel servers 111A-111N not in use for message exchange during an initial configuration of the group-based communication platform 105 (as defined by the initial configuration key). Upon determining that a channel server 111 exhibits failing health characteristics, the admin servers 114A-114N update the configuration key to replace the failing channel server 111 with a spare channel server 111 determined to be healthy. Upon completing this replacement of a failing channel server 111 with a new, spare healthy channel server 111, any gateway servers 107A-107N having a subscription with the failing channel server 111 automatically update their subscriptions (e.g., upon receiving the updated configuration key) to the new channel server 111. In certain embodiments, the gateway servers 107A-107N may be configured to update their subscriptions to the new, healthy channel server 111 based at least in part on time-stamps of already received and/or transmitted messages. When updating the subscription, the gateway servers 107A-107N identify any messages having a time-stamp after the last message known to the gateway servers 107A-107N and ensures that all those messages are appropriately provided to the new channel server 111 and/or to the respective client devices 101A-101N, to ensure that all messages are appropriately delivered and/or stored even across a replacement channel server 111.

The updated configuration key generated by the status checker 110 as being reflective of the updated allocation of channel servers 111 is provided to the gateway servers 107A-107N, such that later-generated messages for exchange within a particular group are provided to the appropriate channel server 111 having affinity for the group.

Moreover, the channel servers 111A-111N may be configured for ensuring no messages are lost as a result of the updates to the configuration key. In the event messages generated prior to the configuration key update are not delivered until after the configuration key update (e.g., a user does not activate the client device-based group-based communication interface for a period of time encompassing the configuration key update), the channel servers 111A-111N synchronizes messages for delivery among all gateway servers 107 having affinity for the group based at least in part on time stamps associated with the various messages, such that messages generated prior to the configuration key update may be synchronized and ultimately delivered to respective client devices 101 via the interface controller 109.

Additional Implementation Details

Although example processing systems have been described in FIGS. 2-6, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for automated load allocation among a plurality of channel servers configured for data exchange within a group-based communication platform, the method comprising:
    monitoring health characteristics of a plurality of channel servers based at least in part on health data compiled by a status checker, wherein each of the plurality of channel servers synchronize communications between client devices of at least one group of client devices as defined based at least in part on a configuration key and wherein a plurality of gateway servers are subscribed with each of the channel servers based on a subscription; and upon detecting failing health characteristics of a failing channel server identified within the plurality of channel servers:
establishing a lock between a first admin server of a plurality of admin servers and the configuration key;
updating the configuration key via the first admin server to replace the failing channel server with a replacement channel server; and
releasing the configuration key to implement the updated configuration key and to update the subscription of each of the plurality of gateway servers subscribed with the failing channel server to the replacement channel server.

2. The computer-implemented method of claim 1, wherein the configuration key is stored within a memory associated with the status checker and is accessible to each of the plurality of admin servers.

3. The computer-implemented method of claim 1, wherein each of the plurality of admin servers maintains a listing of active and failed channel servers, and wherein monitoring health characteristics of a plurality of channel servers comprises: updating the listing of active and failed channel servers maintained by each of the plurality of admin servers.

4. The computer-implemented method of claim 1, wherein establishing the lock between the first admin server and the configuration key comprises:
each of the plurality of admin servers attempting to establish a lock with the configuration key; and
establishing the lock with the first admin server of the plurality of admin servers to prevent other admin servers from modifying the configuration key.

5. The computer-implemented method of claim 1, wherein establishing the lock between the first admin server and the configuration key comprises:
each of the plurality of admin servers attempting to establish a lock with the configuration key;
establishing a lock with a second admin server of the plurality of admin servers; and
upon detecting failing health characteristics of the second admin server, establishing a lock with the first admin server of the plurality of admin servers to prevent other admin servers from modifying the configuration key.

6. The computer-implemented method of claim 1, wherein the replacement channel server is selected from a plurality of spare channel servers that are not in use for synchronizing communication between client devices.

7. A system for automated load allocation among a plurality of channel servers configured for data exchange within a group-based communication platform, the apparatus comprising:
a plurality of admin servers, wherein each admin server comprises:
one or more non-transitory memory storage areas; and
one or more processors; and
wherein the plurality of admin servers are collectively configured to:
monitor health characteristics of a plurality of channel servers based at least in part on health data compiled by a status checker, wherein each of the plurality of channel servers synchronize communications between client devices of at least one group of client devices as defined based at least in part on a configuration key and wherein a plurality of gateway servers are subscribed with each of the channel servers based on a subscription; and upon detecting failing health characteristics of a failing channel server identified within the plurality of channel servers:
establish a lock between a first admin server of the plurality of admin servers and the configuration key;
update the configuration key via the first admin server to replace the failing channel server with a replacement channel server; and
release the configuration key to implement the updated configuration key and to update the subscription of each of the plurality of gateway servers subscribed with the failing channel server to the replacement channel server.

8. The system of claim 7, wherein the configuration key is stored within a memory associated with the status checker and is accessible to each of the plurality of admin servers.

9. The system of claim 7, wherein each of the plurality of admin servers maintains a listing of active and failed channel servers within the one or more non-transitory memory storage areas, and wherein monitoring health characteristics of a plurality of channel servers comprises: updating the listing of active and failed channel servers maintained by each of the plurality of admin servers.

10. The system of claim 7, wherein establishing the lock between the first admin server and the configuration key comprises:
each of the plurality of admin servers attempting to establish a lock with the configuration key; and
establishing the lock with the first admin server of the plurality of admin servers to prevent other admin servers from modifying the configuration key.

11. The system of claim 7, wherein establishing the lock between the first admin server and the configuration key comprises:
each of the plurality of admin servers attempting to establish a lock with the configuration key;
establishing a lock with a second admin server of the plurality of admin servers; and
upon detecting failing health characteristics of the second admin server, establishing a lock with the first admin server of the plurality of admin servers to prevent other admin servers from modifying the configuration key.

12. The system of claim 7, wherein the replacement channel server is selected from a plurality of spare channel servers that are not in use for synchronizing communication between client devices.

13. A computer program product for automated load allocation among a plurality of channel servers configured for data exchange within a group-based communication platform, the computer program product comprising at least one non-transitory computer-readable storage medium having computer-readable program code portions stored therein, the computer-readable program code portions comprising an executable portion configured to:
monitor health characteristics of a plurality of channel servers based at least in part on health data compiled by a status checker, wherein each of the plurality of channel servers synchronize communications between client devices of at least one group of client devices as defined based at least in part on a configuration key and wherein a plurality of gateway servers are subscribed with each of the channel servers based on a subscription; and
upon detecting failing health characteristics of a failing channel server identified within the plurality of channel servers:

establish a lock between a first admin server of a plurality of admin servers and the configuration key;

update the configuration key via the first admin server to replace the failing channel server with a replacement channel server; and release the configuration key to implement the updated configuration key and to update the subscription of each of the plurality of gateway servers subscribed with the failing channel server to the replacement channel server.

14. The computer-program product of claim 13, wherein the configuration key is stored within a memory associated with the status checker and is accessible to each of the plurality of admin servers.

15. The computer-program product of claim 13, wherein establishing the lock between the first admin server and the configuration key comprises:

each of the plurality of admin servers attempting to establish a lock with the configuration key; and establishing the lock with the first admin server of the plurality of admin servers to prevent other admin servers from modifying the configuration key.

16. The computer-program product of claim 13, wherein establishing the lock between the first admin server and the configuration key comprises:

each of the plurality of admin servers attempting to establish a lock with the configuration key;

establishing a lock with a second admin server of the plurality of admin servers; and upon detecting failing health characteristics of the second admin server, establishing a lock with the first admin server of the plurality of admin servers to prevent other admin servers from modifying the configuration key.

17. The computer-program product of claim 13, wherein the replacement channel server is selected from a plurality of spare channel servers that are not in use for synchronizing communication between client devices.

* * * * *